United States Patent
Bai

(10) Patent No.: US 11,089,551 B2
(45) Date of Patent: Aug. 10, 2021

(54) METHOD FOR POWER SAVING CONTROL AND RELATED PRODUCTS

(71) Applicant: GUANGDONG OPPO MOBILE TELECOMMUNICATIONS CORP., LTD., Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 16/692,502

(22) Filed: Nov. 22, 2019

(65) Prior Publication Data

US 2020/0092817 A1 Mar. 19, 2020

Related U.S. Application Data

(63) Continuation of application No. PCT/CN2018/086203, filed on May 9, 2018.

(30) Foreign Application Priority Data

May 31, 2017 (CN) .......................... 201710400897.0

(51) Int. Cl.
*H04W 4/00* (2018.01)
*H04W 52/02* (2009.01)

(52) U.S. Cl.
CPC ... *H04W 52/0258* (2013.01); *H04W 52/0264* (2013.01)

(58) Field of Classification Search
CPC ......... H04W 52/0258; H04W 52/0264; H04W 4/072; G06F 1/32; G06F 1/3287; G06F 1/3206; G06F 1/3231
See application file for complete search history.

(56) References Cited

U.S. PATENT DOCUMENTS 5,664,203 A 9/1997 Hong et al.
8,913,004 B1 12/2014 Bozarth et al.
(Continued)

FOREIGN PATENT DOCUMENTS

CN 1967447 A 5/2007
CN 103576830 A 2/2014
(Continued)

OTHER PUBLICATIONS

Extended European search report issued in corresponding European application No. 118809038.5 dated Apr. 30, 2020.
(Continued)

*Primary Examiner* — Abdelnabi O Musa
(74) *Attorney, Agent, or Firm* — Young Basile Hanlon & MacFarlane, P.C.

(57) ABSTRACT

A method for power saving control and related products are provided. The method includes the following. A terminal device is monitored to determine a first activity content of a user in a current time period, and a second activity content of the user based on a previous time period is obtained. According to the first activity content and the second activity content, a first probability that the terminal device is to be used by the user in the current time period is determined. A power saving mode is enabled in response to the first probability being less than a first threshold.

11 Claims, 3 Drawing Sheets

(56) References Cited

U.S. PATENT DOCUMENTS

| | | | | |
|---|---|---|---|---|
| 2004/0214616 | A1* | 10/2004 | Malcolm | H04W 52/0241 |
| | | | | 455/574 |
| 2008/0130543 | A1* | 6/2008 | Singh | H04N 21/43637 |
| | | | | 370/311 |
| 2009/0210726 | A1* | 8/2009 | Song | G06F 11/3055 |
| | | | | 713/300 |
| 2012/0260112 | A1* | 10/2012 | Kashyap | G06F 1/3287 |
| | | | | 713/320 |
| 2013/0250825 | A1* | 9/2013 | Gosal | H04W 52/0232 |
| | | | | 370/311 |
| 2014/0082384 | A1* | 3/2014 | De Cesare | G06F 11/3438 |
| | | | | 713/320 |
| 2017/0075411 | A1* | 3/2017 | Goldsmith | H04W 4/027 |

FOREIGN PATENT DOCUMENTS

| | | |
|---|---|---|
| CN | 103699203 A | 4/2014 |
| CN | 104090646 A | 10/2014 |
| CN | 104092822 A | 10/2014 |
| CN | 104580710 A | 4/2015 |
| CN | 105404382 A | 3/2016 |
| CN | 106250163 A | 12/2016 |

OTHER PUBLICATIONS

International search report issued in corresponding international application No. PCT/CN2018/086203 dated Aug. 13, 2018.
First examination report issued in corresponding IN application No. 201917047274 dated Jun. 4, 2021.

\* cited by examiner

METHOD FOR POWER SAVING CONTROL AND RELATED PRODUCTS

CROSS-REFERENCE TO RELATED APPLICATION(S)

This application is a continuation of International Application No. PCT/CN2018/086203, filed on May 9, 2018, which claims priority to Chinese Patent Application No. 201710400897.0, filed on May 31, 2017, the disclosures of both of which are hereby incorporated by reference in their entireties.

TECHNICAL FIELD

The present disclosure relates to the technical field of terminal device, and particularly to a method for power saving control and related products.

BACKGROUND

A power saving mode refers to an operating state of a terminal device operating at a lower power consumption. The power saving mode is a relative term. In general, taking a certain operating state of the terminal device as a reference, if power saving is achieved by turning off some applications or functional components or reducing power consumption of some functional components, an operating state after power reduction can be referred to as the power saving mode.

At present, there are generally two manners to start the power saving mode. The first manner is that, when power of the terminal device is low, a user is asked to operate the terminal device to enter the power saving mode to extend use time of the terminal device. The second manner is that, if the terminal device is not operated by the user for a period of time, automatically perform operations such as entering a standby state or turning off a screen to enter the power-saving mode.

SUMMARY

According to a first aspect, implementations provide a method for power saving control. The method includes the following. A terminal device is monitored to determine a first activity content of a user in a current time period, and a second activity content of the user is obtained based on a previous time period. Determine, according to the first activity content and the second activity content, a first probability that the terminal device is to be used by the user in the current time period. A power saving mode is enabled in response to the first probability being less than a first threshold.

According to a second aspect, implementations provide a terminal device. The terminal device includes a processing unit and a communication unit. The processing unit is configured to: predict a first activity content of a user in a current time period, and obtain a second activity content of the user in a previous time period, determine, according to the first activity content and the second activity content, a first probability that the terminal device is to be used by the user in the current time period, and enable a power saving mode in response to the first probability being less than a first threshold.

According to a third aspect, implementations provide a computer readable storage medium. The computer readable storage medium is configured to store computer programs. The computer programs, when executed by a computer, are operable with the computer to execute all or part of the operations of any of the methods of the first aspect of the implementations.

BRIEF DESCRIPTION OF DRAWINGS

The following briefly introduces the accompanying drawings involved in implementations.

DETAILED DESCRIPTION

In order for those skilled in the art to better understand technical solutions, in the following, technical solutions of implementations will be described clearly and completely with reference to accompanying drawings in implementations. Apparently, implementations described hereinafter are merely some implementations, rather than all implementations. All other implementations obtained by those of ordinary skill in the art based on implementations without creative efforts shall fall within the protection scope.

The terms "first", "second", and the like used in the specification, the claims, and the accompany drawings are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units. Instead, it can optionally include other steps or units that are not listed; alternatively, other steps or units inherent to the process, method, product, or apparatus can also be included.

The term "implementation" referred to herein means that a particular feature, structure, or character described in conjunction with the implementation may be contained in at least one implementation. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The terminal device in implementations may include various handheld devices, in-vehicle devices, wearable devices, computing devices which have wireless communication functions, or other processing devices connected to the wireless modem, and various forms of user equipment (UE), mobile station (MS), etc.

The following describes implementations with reference to the accompanying drawings.

Figure 1:
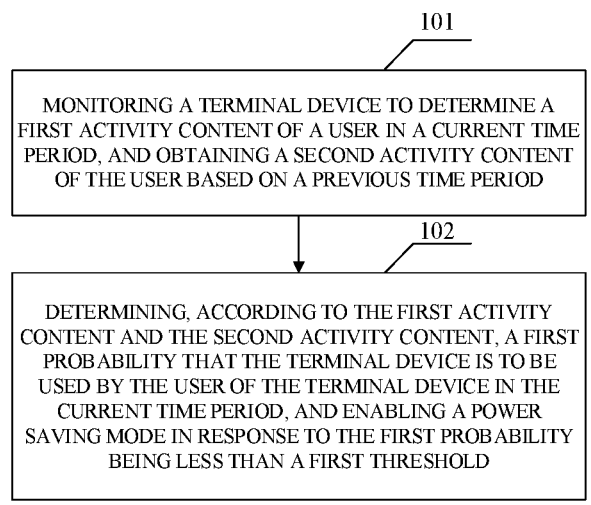
FIG. 1 is a schematic flow chart illustrating a method for power saving control according to implementations.

FIG. 1 is a schematic flow chart illustrating a method for power saving control according to implementations. The method is applicable to a terminal device. As illustrated, the method begins at 101.

At 101, a terminal device is monitored to determine a first activity content of a user in a current time period, and a second activity content of the user is obtained based on a previous time period(s).

In this implementation, the first activity content is determined by monitoring the terminal device. The first activity content can be exercising, sleeping, working, etc. Because there are certain errors in predicting an activity of the user with one parameter (i.e., the first activity content) monitored, another parameter (i.e., second activity content) is further provided to calibrate. For example, activities of most users of terminal devices are relatively regular, that is, there is a high probability that the users will behave regularly in a certain time period. For example, some users sleep after 11 o'clock while some users wake up at 6 o'clock every day, use the mobile phone for about ten minutes, and then wash and go out. Those constitute the second activity content. For users with regular activities, the result (activity) predicted with the first activity content can be calibrated with the second activity content.

At 102, determine, according to the first activity content and the second activity content, a first probability that the terminal device is to be used by the user in the current time period, and a power saving mode is enabled in response to the first probability being less than a first threshold.

In this implementation, whether the terminal device is to be used by the user can be predicted according to the first activity content and the second activity content. If the terminal device is in an automatic control mode, for example, the terminal device enters the power saving mode 1 minute later if no operation of the user is received, then in this implementation, the terminal device can be enabled to enter the power saving mode quickly compared with the automatic control mode.

According to this implementation, both the first activity content determined and the second activity content from previous information are contemplated to determine the probability that the terminal device is used by the user in the current time period, and the terminal device is controlled to enter the power saving mode according to the above probability, which is more accurate and smart.

The implementations can be applicable to terminal devices in a non-charging mode.

Furthermore, the power saving mode can be any operating mode that has power consumption lower than an initial state, and can be enabled in various ways, such as turning off an application(s), entering a standby mode, lowering a clock rate of hardware, decreasing brightness of a screen, and the like. The disclosure is not particularly restricted.

In at least one implementation, how the first activity content is determined or predicted is provided. In detail, the terminal device is monitored to determine the first activity content of the user as follows. When there is an application running in the terminal device, determine the first activity content of the user according to a type of the application, a time interval between a moment in which the application is most-recently operated and a current time, and a motion state of the terminal device.

In at least one implementation, some parameters used for determining the first activity content are provided as reference parameters. It should be noted that, any parameter that can be used to determine what the user is currently doing can be regarded as a reference parameter, and thus the above examples should not be construed as limitations to the implementations.

In at least one implementation, how a second probability of using the terminal device is determined is provided. In detail, after the first activity content of the user is determined, the following is further conducted. Determine a probability that the first activity content is properly determined. Determine, according to the probability that the first activity content is properly determined, the second probability of using the terminal device.

When determining or predicting the first activity content, there exists the probability that the first activity content is properly determined or predicted, i.e., a probability of belonging to a certain first activity content. Besides, under a certain first activity content, there is also a second probability of using the terminal device. For example, if a probability that the user is predicted to be in a sleep state is A and a second probability of using the terminal device is B, and a probability that the user is predicted to be in a working state is C and a second probability of using the terminal device is D, then B should be less than D. The probability that the first activity content is properly determined depends on the reference parameter. A second probability of using the terminal device under a certain first activity content can be fixed, which can be obtained through a preset manner. The above second probability of using the terminal device is determined according to both the probability that the first activity content is properly determined and the second probability of using the terminal device under a certain first activity content.

In at least one implementation, how the first probability that the terminal device is to be used by the user in the current time period is determined is provided. In detail, determine, according to the first activity content and the second activity content, the first probability that the terminal device is to be used by the user in the current time period as follows. Determine, according to the first activity content and the second activity content, whether a third probability that the terminal device is not used by the user in the current time period is greater than a second threshold. A weighting of the second probability of using the terminal device is reduced based on a determination that the third that the terminal device is not used by the user in the current time period is greater than the second threshold. A product of the second probability of using the terminal device and the weighting is used as the first probability that the terminal device is to be used by the user in the current time period.

In at least one implementation, the product of the second probability of using the terminal device and the weighting is used, where the weighting is a weighting of the second probability of using the terminal device. In another example, a weighting of a probability of not using the terminal device can be used. When the third probability that the terminal device is not used by the user in the current time period is greater than the second threshold, the weighting of the probability of not using the terminal device can be increased. Thereafter, calculate a product of the probability of not using the terminal device and the weighting of the probability of not using the terminal device. Finally, a result of 1 minus this product can be used as the second probability of using the terminal device. Therefore, the second probability of using the terminal device can be calculated in various ways, and the above examples are not to be construed as limiting the implementations.

In at least one implementation, provided is a modification to entering the power saving mode by mistake. In detail, before the power saving mode is enabled, the following is further conducted. Running state data of an application running in the terminal device is stored. The running state data is loaded into a memory when the terminal device is picked up, and the terminal device waits for an operation of the user of the terminal device.

In at least one implementation, the running state data of the application will be stored (for example, cached) when the terminal device is in the power saving mode. In this way, in the case of a wrong prediction result, for example, if the terminal device is picked up by the user, the running state data cached can be loaded immediately to get the application ready for use, which is possible to reduce a waiting time of the user for the application to be ready for use.

In at least one implementation, provided is a solution subsequent to a right prediction result. In detail, the following is further conducted. When the running state data has been stored for more than a predetermined time and the third probability that the terminal device is not used by the user in the current time period is greater than the second threshold, the running state data stored is deleted and the application running in the terminal device is stopped, and a power saving mode in a highest level is entered.

In at least one implementation, the predetermined time may be a waiting time of the terminal device to enter the power saving mode. For example, if the user sets decreasing brightness of the display 1 minute later or entering the power saving mode 1 minute later if no operation of the user is received, then here "1 minute" is the predetermined time. Therefore, in at least one implementation, the terminal device can enter the power saving mode in a time shorter than the waiting time set by the user to enter the power saving mode.

In at least one implementation, the current time period is in a correspondence relationship with the previous time period in terms of time.

For example, if the current time period is from 5:00 pm to 5:10 pm today, the previous time period can be 5:00 pm to 5:10 pm yesterday, last few days, last week, last few weeks, last month, last few months, even last year, or the like.

Figure 2:
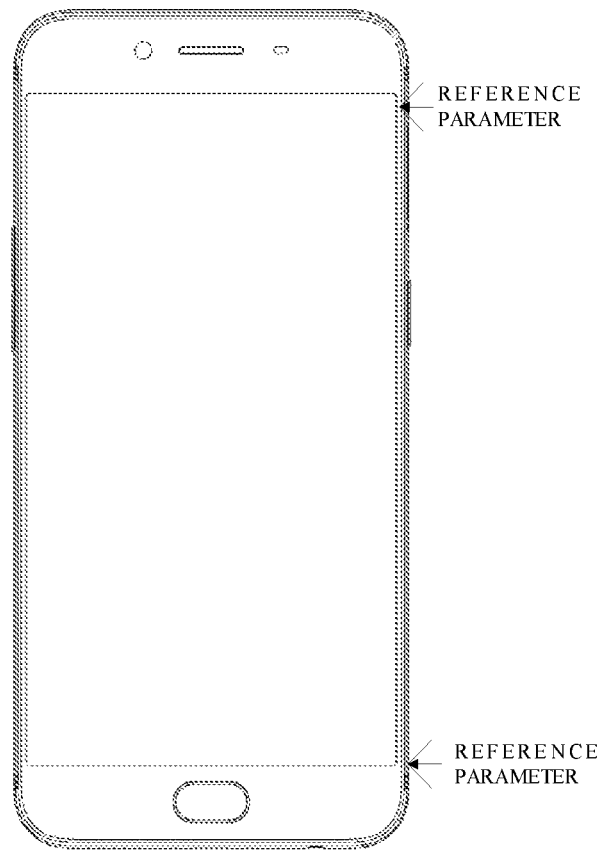
FIG. 2 is a schematic diagram illustrating reference parameters collection with a mobile phone according to implementations.

As illustrated in FIG. 2, the above method is applied to a mobile phone. The mobile phone obtains reference parameters required for determining or predicting the first activity content of the user through various devices that can acquire external information, such as a camera, a microphone, a gravity sensor, a light sensor, and the like. Thereafter, the first activity content is processed in the mobile phone, as described in the foregoing method implementations. At last the mobile phone enters the power saving mode.

Figure 3:
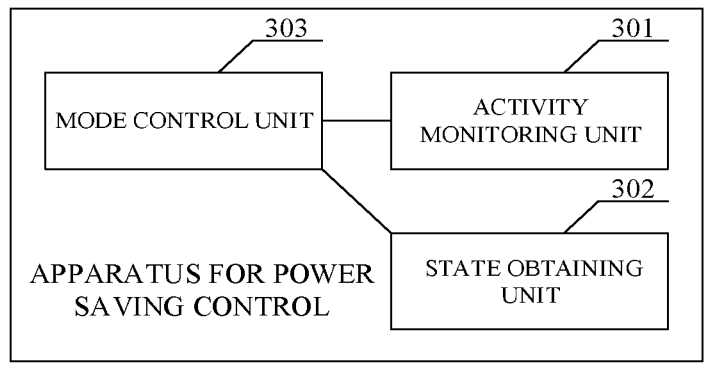
FIG. 3 is a schematic diagram illustrating an apparatus for power saving control according to implementations.

As illustrated in FIG. 3, implementations further provide an apparatus for power saving control. The apparatus for power saving control includes an activity monitoring unit 301, a state obtaining unit 302, and a mode control unit 303.

The activity monitoring unit 301 is configured to predict a first activity content of a user in a current time period. The state obtaining unit 302 is configured to obtain a second activity content of the user in a previous time period. The mode control unit 303 is configured to determine, according to the first activity content and the second activity content, a first probability that the terminal device is to be used by the user in the current time period, and to enable a power saving mode in response to the first probability being less than a first threshold.

In an example, in terms of predicting the first activity content of the user, the activity monitoring unit 301 is configured to: predict the first activity content of the user according to a type of an application, a time interval between a moment in which the application is most-recently operated and a current time, and a motion state of the terminal device, in response to the application running in the terminal device.

In an example, the activity monitoring unit 301 is further configured to: determine a probability that the first activity content is properly determined, and determine, according to the probability that the first activity content is properly determined, a second probability of using the terminal device, after determining the first activity content of the user.

In an example, in terms of determining, according to the first activity content and the second activity content, the first probability that the terminal device is to be used by the user in the current time period, the mode control unit 303 is configured to: determine, according to the first activity content and the second activity content, whether a third probability that the terminal device is not used by the user in the current time period is greater than a second threshold, reduce a weighting of the second probability of using the terminal device based on a determination that the third probability that the terminal device is not used by the user in the current time period is greater than the second threshold, and use a product of the second probability of using the terminal device and the weighting as the first probability that the terminal device is to be used by the user in the current time period.

In an example, the mode control unit 303 is further configured to: store running state data of an application running in the terminal device, load the running state data into a memory when the terminal device is picked up, and wait for an operation of the user of the terminal device.

In an example, the mode control unit 303 is further configured to: when the running state data has been stored for more than a predetermined time and the third probability that the terminal device is not used by the user in the current time period is greater than the second threshold, delete the running state data stored and stop the application running in the terminal device, and enter a power saving mode in a highest level.

In at least one implementation, the current time period is in a correspondence relationship with the previous time period in terms of time.

Figure 4:
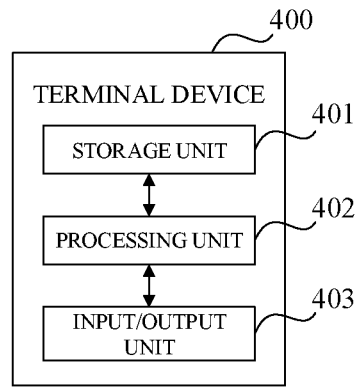
FIG. 4 is a schematic structural diagram illustrating a terminal device according to implementations.

As shown in FIG. 4, implementations further provide a terminal device. The terminal device includes a processing unit 402 and an input/output unit 403. The processing unit 402 is configured to control and manage actions of the terminal device. For example, the processing unit 402 is operative to support the terminal device in performing operations 101-102 of FIG. 1 or other processes for the techniques described herein. The I/O unit 403 is configured to support data input and output. The terminal device may further include a storage unit 401 configured to store program codes and data of the terminal device.

The processing unit 402 may be, a processor or a controller (for example, a central processing unit (CPU)), a general-purpose processor, a digital signal processor (DSP), an application-specific integrated circuit (ASIC), a field programmable gate array (FPGA), or other programmable logic devices, transistor logic devices, hardware components, or any combination thereof. Various example logical blocks, modules, and circuits described in conjunction with the disclosure may be achieved or implemented. The processor may also be a combination of computing functions, for example, a combination of one or more microprocessors, a combination of the DSP and the microprocessor, and the like. The I/O unit 403 can be a microphone, an earpiece, a speaker, a display, etc. The storage unit 401 may be a memory.

The I/O unit 403 is configured to receive data input and output data.

The above processing unit 402 is configured to monitor a terminal device to determine a first activity content of a user, and obtain a second activity content of the user based on a previous time period, determine, according to the first activity content and the second activity content, a first probability that the terminal device is to be used by the user in the current time period, and enable a power saving mode in response to the first probability being less than a first threshold.

In this implementation, the first activity content is determined by monitoring the terminal device. The first activity content can be exercising, sleeping, working, etc. Because there are certain errors in predicting an activity of the user with one parameter (i.e., the first activity content) monitored, another parameter (i.e., second activity content) is further provided to calibrate. For example, activities of most users of terminal devices are relatively regular, that is, there is a high probability that the users will behave regularly in a certain time period. For example, some users sleep after 11 o'clock while some users will wake up at 6 o'clock every day, use the mobile phone for about ten minutes, and then wash and go out. The second activity content follows the above pattern. For users with regular activities, the result predicted with the first activity content can be calibrated with the second activity content.

In this implementation, whether the terminal device is to be used by the user can be predicted according to the first activity content and the second activity content. If the terminal device is in an automatic control mode, for example, the terminal device enters the power saving mode 1 minute later if no operation of the user is received, then in this implementation, the terminal device can be enabled to enter the power saving mode in a shorter time compared with the automatic control mode.

According to this implementation, both the first activity content determined and the second activity content from previous information are contemplated to determine the first probability that the terminal device is to be used by the user in the current time period, and the terminal device is controlled to enter the power saving mode according to the above probability, which is more accurate and smart.

The implementations can be applicable to terminal devices in a non-charging mode.

Furthermore, the power saving mode can be any operating mode that has power consumption lower than an initial state, and can be enabled in various ways, such as turning off an application(s), entering a standby mode, lowering a clock rate of hardware, decreasing brightness of a screen, and the like. The disclosure is not particularly restricted.

In an example, the processing unit 402 configured to monitor the terminal device to determine the first activity content of the user is configured to: when there is an application running in the terminal device, determine the first activity content of the user according to a type of the application, a time interval between a moment in which the application is most-recently operated and a current time, and a motion state of the terminal device.

For other processes that the processing unit 402 is configured for execution, reference may be made to the foregoing method implementations, and details are not described herein again.

Figure 5:
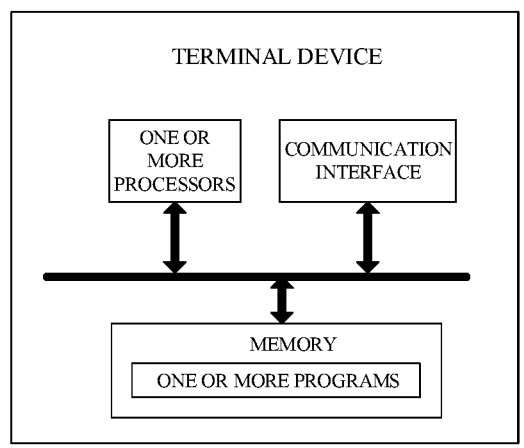
FIG. 5 is a schematic structural diagram illustrating a terminal device according to implementations.

FIG. 5 is a schematic structural diagram illustrating a terminal device according to implementations. As illustrated, the terminal device includes one or more processors, a memory configured to store one or more programs, and a communication interface. The one or more programs are configured to be executed by the one or more processors and include instructions configured to: monitor a terminal device to determine a first activity content of a user in a current time period, and obtain a second activity content of the user based on a previous time period, determine, according to the first activity content and the second activity content, a first probability that the terminal device is to be used by the user in the current time period, and enable a power saving mode in response to the first probability being less than a first threshold.

In this implementation, the first activity content is determined by monitoring the terminal device. The first activity content can be exercising, sleeping, working, etc. Because there are certain errors in predicting an activity of the user with one parameter (i.e., the first activity content) monitored, another parameter (i.e., second activity content) is further provided to calibrate. For example, activities of most users of terminal devices are relatively regular, that is, there is a high probability that the users will behave regularly in a certain time period. For example, some users sleep after 11 o'clock while some users wake up at 6 o'clock every day, use the mobile phone for about ten minutes, and then wash and go out. The second activity content follows the above pattern. For users with regular activities, the result predicted with the first activity content can be calibrated with the second activity content.

In this implementation, whether the terminal device is to be used by the user can be predicted according to the first activity content and the second activity content. If the terminal device is in an automatic control mode, for example, the terminal device enters the power saving mode 1 minute later if no operation of the user is received, then in this implementation, the terminal device can be enabled to enter the power saving mode in a shorter time (for example, less than 1 minute).

According to this implementation, both the first activity content determined and the second activity content from previous information are contemplated to determine the first probability that the terminal device is to be used by the user in the current time period, and the terminal device is controlled to enter the power saving mode according to the above probability, which is more accurate and smart.

The implementations can be applicable to terminal devices in a non-charging mode.

Furthermore, the power saving mode can be any operating mode that has power consumption lower than an initial state, and can be enabled in various ways, such as turning off an application(s), entering a standby mode, lowering a clock rate of hardware, decreasing brightness of a screen, and the like. The disclosure is not particularly restricted.

In at least one implementation, the instructions of the one or more programs configured to monitor the terminal device to determine the first activity content of the user are configured to: when there is an application running in the terminal device, determine the first activity content of the user according to a type of the application, a time interval between a moment in which the application is most-recently operated and a current time, and a motion state of the terminal device.

In at least one implementation, some parameters used for determining the first activity content are provided as reference parameters. It should be noted that, any parameter that can be used to determine what the user is currently doing can be regarded as a reference parameter, and thus the above examples should not be construed as limitations to the implementations.

In at least one implementation, how a second probability of using the terminal device is determined is provided. In detail, the one or more programs further include instructions configured to: determine a probability of determining properly the first activity content, and determine, according to the probability of determining properly the first activity content, the second probability of using the terminal device corresponding to the probability of determining properly the first activity content, after the first activity content of the user is determined.

When determining or predicting the first activity content, there exists the probability of determining or predicting properly the first activity content, i.e., a probability of belonging to a certain first activity content. Besides, in a certain first activity content, there is also a second probability of using the terminal device. For example, if a probability that the user is predicted to be in a sleep state is A and a second probability of using the terminal device is B, and a probability that the user is predicted to be in a working state is C and a second probability of using the terminal device is D, B should be less than D. The probability of determining properly the first activity content depends on the reference parameter. A second probability of using the terminal device in a certain first activity content can be fixed, which can be obtained through a preset manner. The above second probability of using the terminal device corresponding to the probability of determining properly the first activity content is determined according to both the probability of determining properly the first activity content and the second probability of using the terminal device in a certain first activity content.

In at least one implementation, how the first probability that the terminal device is to be used by the user in the current time period is determined is provided. In detail, the instructions of the one or more programs configured to determine, according to the first activity content and the second activity content, the first probability that the terminal device is to be used by the user in the current time period are configured to: determine, according to the first activity content and the second activity content, whether a third probability that the terminal device is not used by the user in the current time period is greater than a second threshold, reduce a weighting of the second probability of using the terminal device based on a determination that the third probability that the terminal device is not used by the user in the current time period is greater than the second threshold, and use a product of the second probability of using the terminal device and the weighting as the first probability that the terminal device is to be used by the user in the current time period.

In at least one implementation, the product of the second probability of using the terminal device and the weighting is used, where the weighting is a weighting of the second probability of using the terminal device. In another example, a weighting of a probability of not using the terminal device can be used. When the third probability that the terminal device is not used by the user in the current time period is greater than the second threshold, the weighting of the probability of not using the terminal device can be increased. Thereafter, calculate a product of the probability of not using the terminal device and the weighting of the probability of not using the terminal device. Finally, a result of 1 minus this product can be used as the second probability of using the terminal device. Therefore, the second probability of using the terminal device can be calculated in various ways, and the above examples are not to be construed as limiting the implementations.

In at least one implementation, provided is a modification to entering the power saving mode by mistake. In detail, the one or more programs further include instructions configured to: store running state data of an application running in the terminal device, load the running state data into a memory when the terminal device is picked up, and wait for an operation of the user, before the power saving mode is enabled.

In at least one implementation, the running state data of the application has been stored (for example, cached) when the terminal device is in the power saving mode. In this way, in the case of a wrong prediction result, for example, if the terminal device is picked up by the user, the running state data cached can be loaded immediately to get the application ready for use, which is possible to reduce a waiting time of the user for the application to be ready for use.

In at least one implementation, provided is a solution subsequent to a right prediction result. In detail, the one or more programs further include instructions configured to: when the running state data has been stored for more than a predetermined time and the third probability that the terminal device is not used by the user in the current time period is greater than the second threshold, delete the running state data stored and stop the application running in the terminal device, and enter a power saving mode in a highest level.

In at least one implementation, the predetermined time may be a waiting time of the terminal device to enter the power saving mode. For example, if the user sets turning down brightness of the display 1 minute later or entering the power saving mode 1 minute later if no operation of the user is received, then here "1 minute" is the predetermined time. Therefore, in at least one implementation, the terminal device can enter the power saving mode in a time shorter than the waiting time, set by the user, to enter the power saving mode.

In at least one implementation, the current time period corresponds to the previous time period in terms of time.

As illustrated in FIG. 2, the above method is applied to a mobile phone. The mobile phone obtains reference parameters required for determining or predicting the first activity content of the user through various devices that can acquire external information, such as a camera, a microphone, a gravity sensor, a light sensor, and the like. Thereafter, the first activity content is processed in the mobile phone, as described in the foregoing method implementations. At last the mobile phone enters the power saving mode.

Figure 6:
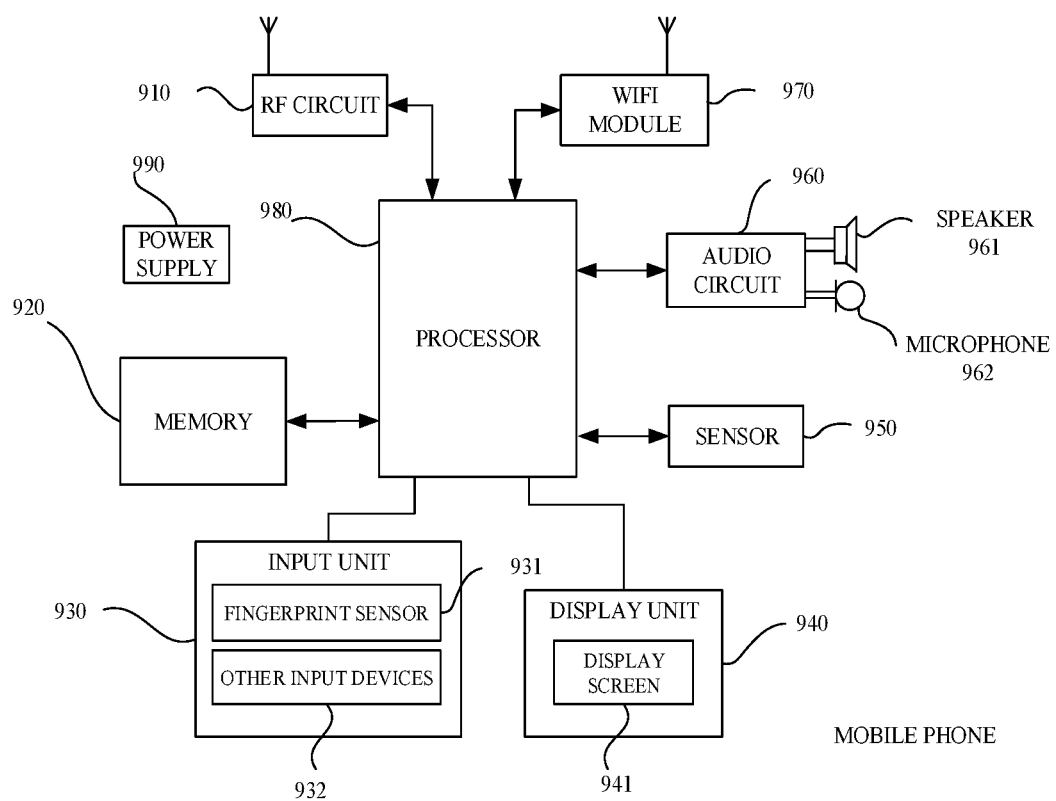
FIG. 6 is a schematic structural diagram illustrating a terminal device according to implementations.

Implementations also provide another terminal device. As illustrated in FIG. 6, only parts related to the implementations are illustrated for ease of description. For technical details not described, reference may be made to the method implementations. The terminal device may be any device, such as a mobile phone, a tablet computer, a personal digital assistant (PDA), a point of sale terminal (POS), an on-board computer and the like. The following describes the mobile phone as an example of the terminal device.

FIG. 6 is a structural diagram illustrating parts of a mobile phone related to the terminal device according to other implementations. As illustrated in FIG. 6, the mobile phone includes a radio frequency (RF) circuit 910, a memory 920, an input unit 930, a display unit 940, a sensor 950, an audio circuit 960, a wireless fidelity (Wi-Fi) module 970, a processor 980, a power supply 990 and other components. Those skilled in the art can understand that the structure of the mobile phone illustrated in FIG. 6 does not constitute any limitation on a mobile phone. The mobile phone configured to implement technical solutions may include more or fewer components than illustrated or may combine certain components or different components.

In the following, various components of the mobile phone will be described in detail with reference to FIG. 6.

The RF circuit 910 is configured to transmit or receive information. Generally, the RF circuit 910 includes but is not limited to an antenna, at least one amplifier, a transceiver, a coupler, a low noise amplifier (LNA), a duplexer, and the like. In addition, the RF circuit 910 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules, and the processor 980 is configured to execute various function applications and data processing of the mobile phone by running the software programs and the modules stored in the memory 920. The memory 920 mainly includes a program storage area and a data storage area. The program storage area may store an operating system, application programs required for at least one function, and so on. The data storage area may store data (such as usage parameters of the application) created according to use of the mobile phone, and so on. In addition, the memory 920 may include a high-speed RAM, and may further include a non-volatile memory such as at least one disk storage device, a flash memory device, or other non-volatile solid-state storage devices.

The input unit 930 may be configured to receive input digital or character information and generate key signal input associated with user setting and function control of the mobile phone. The input unit 930 may include a fingerprint sensor 931 and other input devices 932. The fingerprint sensor 931 can collect the fingerprint data of the user. In addition to the fingerprint sensor 931, the input unit 930 may further include other input devices 932. The other input devices 932 may include, but are not limit to, one or more of a touch screen, a physical key, a function key (such as a volume control key, a switch key, etc.), a trackball, a mouse, a joystick, and the like.

The display unit 940 is configured to display information input by the user or information provided for the user or various menus of the mobile phone. The display unit 940 may include a display screen 941. The display screen 941 may be in the form of a liquid crystal display (LCD), an organic light-emitting diode (OLED), and so on. Although the fingerprint sensor 931 and the display screen 941 are illustrated as two separate components in FIG. 6 to realize the input and output functions of the mobile phone, in other examples, the fingerprint sensor 931 may be integrated with the display screen 941 to implement the input and output functions of the mobile phone.

The mobile phone may also include at least one sensor 950, such as a light sensor, a motion sensor, and other sensors. The light sensor may include an ambient light sensor and a proximity sensor, among which the ambient light sensor may adjust the brightness of the display screen 941 according to ambient lights, and the proximity sensor may turn off the display screen 941 and/or backlight when the mobile phone reaches nearby the ear. As a kind of motion sensor, an accelerometer sensor can detect the magnitude of acceleration in all directions (typically three axes) and when the mobile phone is stationary, the accelerometer sensor can detect the magnitude and direction of gravity; the accelerometer sensor can also identify gestures of the mobile phone (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 960, a speaker 961, a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals for output. On the other hand, the microphone 962 converts the received sound signals into electrical signals, which will be received and converted into audio data by the audio circuit 960 for output. The audio data is then processed and transmitted by the processor 980 via the RF circuit 910 to another mobile phone for example, or the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 6, it can be understood that, the Wi-Fi module 970 is not essential to the mobile phone and can be omitted according to actual needs without departing from the essential nature.

The processor 980 is the control center of the mobile phone and is configured to connect various parts of the whole mobile phone through various interfaces and lines, run or execute software programs and/or modules stored in the memory 920, and invoke data stored in the memory 920 to perform various functions of the mobile phone and process data, thereby monitoring the mobile phone as a whole. The processor 980 may include one or more processing units. For example, the processor 980 may integrate an application processor and a modem processor, where the application processor is configured to handle the operating system, the user interface, the application, and so on, and the modem processor is mainly configured to process wireless communication. It will be understood that the above-mentioned modem processor may not be integrated into the processor 980.

The mobile phone also includes a power supply 990 (e.g., a battery) that supplies power to various components. For instance, the power supply 990 may be logically connected to the processor 980 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 1 can be realized based on the structure of the mobile phone.

The functions of the units illustrated in FIGS. 3-4 can be achieved based on the structure of the mobile phone.

Implementations further provides a computer storage medium. The computer storage medium may store computer programs for electronic data interchange, and the computer programs are operable with a computer to execute all or part of operations of any of the methods recited in the method implementations mentioned above. The computer includes the terminal device.

Implementations further provide a computer program product. The computer program product includes a non-transitory computer readable storage medium that stores computer programs. The computer programs are operable with a computer to perform all or part of operations of any of the methods recited in the method implementations mentioned above. The computer program product may be a software installation packet. The computer includes the terminal device.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are example implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations, it is to be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored or skipped. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions essentially, or the part of the technical solutions that contributes to the related art, or all or part of the technical solutions, may be embodied in the form of a software product which is stored in a memory and includes instructions for causing a computer device (which may be a personal computer, a server, or a network device, and so on) to perform all or part of the steps described in the various implementations. The memory includes various medium capable of storing program codes, such as a universal serial bus (USB) flash disk, a read-only memory (ROM), a random-access memory (RAM), a removable hard disk, Disk, compact disc (CD), or the like.

It will be understood by those of ordinary skill in the art that all or part of the operations of the various methods of the implementations described above may be accomplished by means of a program to instruct associated hardware, the program may be stored in a computer-readable memory, which may include a flash memory, a ROM, a RAM, Disk or CD, and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for power saving control, comprising:
   determining a first activity content of a user in a current time period according to a type of an application, a time interval between a moment in which the application is most-recently operated and a current time, and a motion state of a terminal device in response to the application being running in the terminal device;
   obtaining a second activity content of the user based on a previous time period;
   determining a probability that the first activity content is properly determined;
   determining, according to the probability that the first activity content is properly determined, a second probability of using the terminal device;
   determining, according to the first activity content and the second activity content, whether a third probability that the terminal device is not used by the user in the current time period is greater than a threshold;
   reducing a weighting of the second probability of using the terminal device based on a determination that the third probability that the terminal device is not used by the user in the current time period is greater than the threshold;
   using a product of the second probability of using the terminal device and the weighting as a first probability that the terminal device is to be used by the user in the current time period; and
   enabling a power saving mode in response to the first probability being less than a first threshold.

2. The method of claim 1, further comprising:
   before enabling the power saving mode:
   storing running state data of an application running in the terminal device; and
   loading the running state data into a memory in response to the terminal device being picked up and waiting for an operation of the user.

3. The method of claim 2, further comprising:
   deleting the running state data stored, stopping the application running in the terminal device, and enabling a power saving mode in a highest level in response to the running state data being stored for more than a predetermined time and a third probability that the terminal device is not used by the user in the current time period being greater than the threshold.

4. The method of claim 1, wherein the current time period is in a correspondence relationship with the previous time period in terms of time.

5. A terminal device, comprising a processor, a memory configured to store one or more programs, and a communication interface, wherein the one or more programs are configured to be executed by the processor and comprise instructions configured to:
   predict a first activity content of a user in a current time period according to a type of an application, a time interval between a moment in which the application is most-recently operated and a current time, and a motion state of a terminal device in response to the application being running in the terminal device;
   obtain a second activity content of the user in a previous time period;
   determine a probability that the first activity content is properly determined;
   determine, according to the probability that the first activity content is properly determined, a second probability of using the terminal device;
   determine, according to the first activity content and the second activity content, whether a third probability that the terminal device is not used by the user in the current time period is greater than a threshold;
   reduce a weighting of the second probability of using the terminal device based on a determination that the third probability that the terminal device is not used by the user in the current time period is greater than the threshold;
   use a product of the second probability of using the terminal device and the weighting as a first probability that the terminal device is to be used by the user in the current time period; and
   enable a power saving mode in response to the first probability being less than a first threshold.

6. The terminal device of claim 5, wherein the one or more programs further comprise instructions configured to:
   store running state data of an application running in the terminal device; and
   load the running state data into a memory in response to the terminal device being picked up and wait for an operation of the user.

7. The terminal device of claim 6, wherein the one or more programs further comprise instructions configured to:
   delete the running state data stored, stop the application running in the terminal device, and enable a power saving mode in a highest level in response to the running state data being stored for more than a predetermined time and a third probability that the terminal device is not used by the user in the current time period being greater than the threshold.

8. The terminal device of claim 5, wherein the current time period corresponds to the previous time period in terms of time.

9. A non-transitory computer readable storage medium configured to store computer programs which, when executed by a computer, are operable with the computer to:
   determine a first activity content of a user in a current time period according to a type of an application, a time interval between a moment in which the application is most-recently operated and a current time, and a motion state of a terminal device in response to the application being running in the terminal device;
   obtain a second activity content of the user based on a previous time period;
   determine a probability that the first activity content is properly determined;
   determine, according to the probability that the first activity content is properly determined, a second probability of using the terminal device;
   determine, according to the first activity content and the second activity content, whether a third probability that the terminal device is not used by the user in the current time period is greater than a threshold;
   reduce a weighting of the second probability of using the terminal device based on a determination that the third probability that the terminal device is not used by the user in the current time period is greater than the threshold;
   use a product of the second probability of using the terminal device and the weighting as a first probability that the terminal device is to be used by the user in the current time period; and
   enable a power saving mode in response to the first probability being less than a first threshold.

10. The non-transitory computer readable storage medium of claim 9, wherein the computer programs, when executed by the computer, are further operable with the computer to:
   store running state data of an application running in the terminal device; and
   load the running state data into a memory in response to the terminal device being picked up and wait for an operation of the user.

11. The non-transitory computer readable storage medium of claim 10, wherein the computer programs, when executed by the computer, are further operable with the computer to:
   delete the running state data stored, stop the application running in the terminal device, and enable a power saving mode in a highest level in response to the running state data being stored for more than a predetermined time and a third probability that the terminal device is not used by the user in the current time period being greater than the threshold.

* * * * *